United States Patent [19]
Swithers et al.

[11] Patent Number: 5,991,470
[45] Date of Patent: Nov. 23, 1999

[54] ONE-DIMENSIONAL SCANNER SYSTEM FOR TWO-DIMENSIONAL IMAGE ACQUISITION

[75] Inventors: David Jonathan Swithers, North Attleboro; Thomas J. Chisholm, Milton, both of Mass.

[73] Assignee: Computer Identics, Inc., Canton, Mass.

[21] Appl. No.: 08/742,563

[22] Filed: Oct. 28, 1996

Related U.S. Application Data

[63] Continuation of application No. 08/476,777, Jun. 7, 1995, abandoned.

[51] Int. Cl.⁶ .................................................. G06K 9/20
[52] U.S. Cl. .................................................. 382/322
[58] Field of Search .................................. 382/131, 322, 382/275, 323; 358/474, 486, 494

[56] References Cited

U.S. PATENT DOCUMENTS

| | | | |
|---|---|---|---|
| 3,647,956 | 3/1972 | Buck et al. | 348/203 |
| 3,995,166 | 11/1976 | Hobart et al. | 382/322 |
| 4,011,748 | 3/1977 | Bond et al. | 73/67.6 |
| 4,349,847 | 9/1982 | Traino | 358/497 |
| 4,464,011 | 8/1984 | Takahashi et al. | 350/6.1 |
| 4,695,721 | 9/1987 | Fulkerson et al. | 382/322 |
| 4,870,274 | 9/1989 | Hebert et al. | 250/236 |
| 5,184,246 | 2/1993 | Schwartz et al. | 359/216 |
| 5,303,081 | 4/1994 | Totsuka et al. | 359/213 |
| 5,327,171 | 7/1994 | Smith et al. | 348/223 |
| 5,446,271 | 8/1995 | Cherry et al. | 235/462 |
| 5,510,603 | 4/1996 | Hess et al. | 235/454 |

*Primary Examiner*—Andrew W. Johns
*Attorney, Agent, or Firm*—Iandiorio & Teska; Brian J. Colandreo

[57] ABSTRACT

A one-dimensional scanner system for two-dimensional image acquisition includes a flying spot scanner for scanning in a line at a first velocity in a first direction across an object which is moving at a second velocity in a second direction transverse to the first direction; the first and second velocities establish a first sample rate in the second direction for defining a pixel size in the second direction; a timing device for detecting the velocity of the object in the second direction and generating a sample rate in the first direction and a frame accumulator for reading and storing each line scanned, assembling a two-dimensional image of the object and reading out that image; the frame accumulator including a compensation device responsive to the second sample rate for normalizing the second sample rate with the first sample rate to eliminate distortions in the pixel size and two-dimensional image in the first direction.

11 Claims, 7 Drawing Sheets

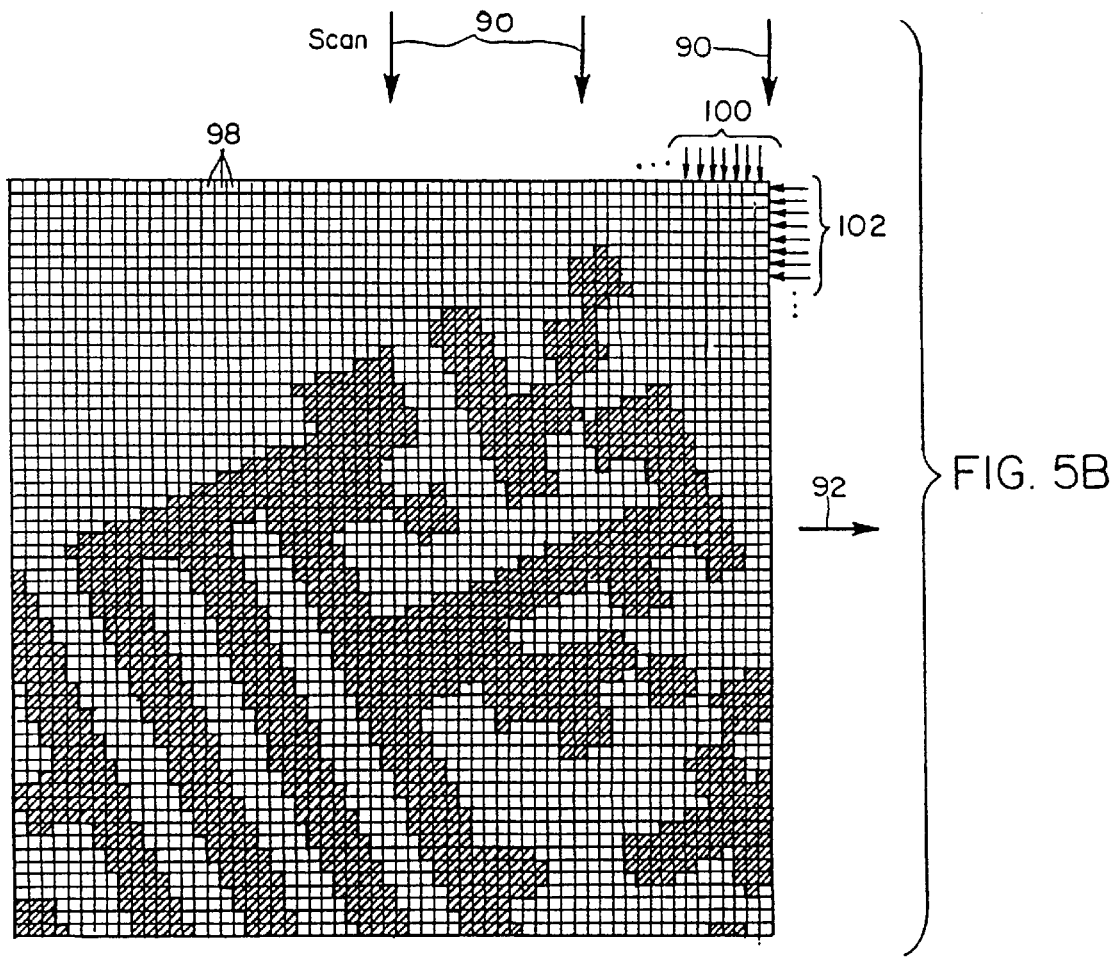
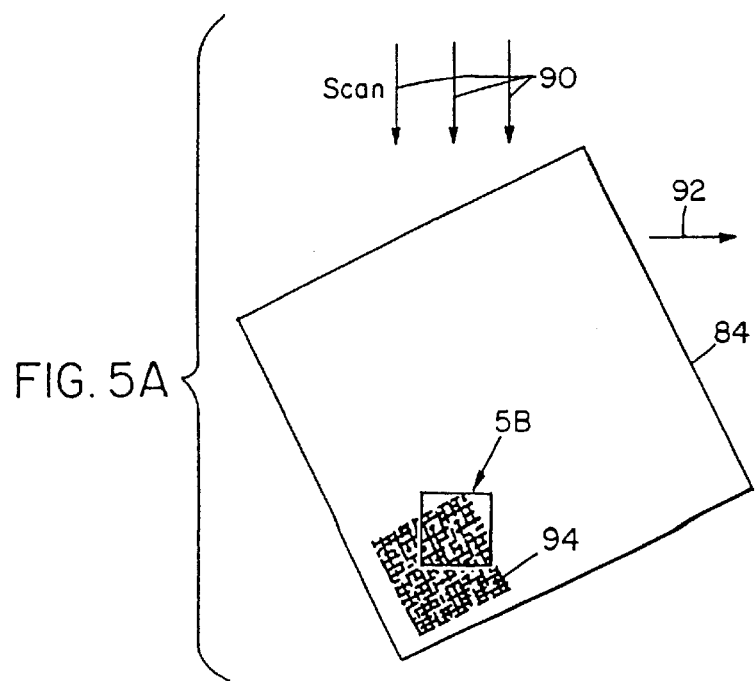

ONE-DIMENSIONAL SCANNER SYSTEM FOR TWO-DIMENSIONAL IMAGE ACQUISITION

This is a continuation of application Ser. No. 08/476,777, filed Jun. 7, 1995 now abandoned.

FIELD OF INVENTION

This invention relates to a one-dimensional scanner system for two-dimensional image acquisition, and more particularly to such a system for acquiring an image of data on moving objects.

BACKGROUND OF INVENTION

High speed automatic identification of random size items has historically been attempted using various optical, magnetic and RF means. By far the most popular is the bar code label. Bar codes are typically read using a low speed (<1000 scans per second) laser line scanner. Normally the laser line must be aligned with the axis of the bar code in such a manner that a single laser line passes through all the bars of the code in a single pass. Although the bar code inherently has a large amount of vertical redundancy to allow for error correction by multiple passes through the data, it is possible for a label to be damaged in such a way as to render no path through a completely undamaged position of the label even though the total damage to the label is small. The large amount of vertical redundancy is also the main drawback of the bar code, because it limits the density of the bar code, i.e., the bar code has a practical limit of around 30 ASCII characters.

Omnidirectional bar code readers have recently been introduced that do not require a complete pass through an entire label by a single line to read the bar code information. These omnidirectional bar code readers acquire positions of a bar code label on successive passes through the label and then typically use a high performance processor to piece these fragments of a label together by looking for overlap between the fragments and/or timing the movement of the item bearing the label with respect to the laser line. To achieve true omnidirectional capability and to cover a large field of view, a typical omnidirectional scanner uses multiple laser beams placed at various angles and locations.

Many other optical data encoding techniques have been proposed. Stacked bar codes and area codes are the most promising of these. These codes have not been widely adopted because a practical reader for them has not been produced. Raster laser line scanners are available for reading stacked bar codes, but these typically have limited fields of view, limited depths of field and are not high speed or omnidirectional. They are only practical in human interactive applications where the operator is required to provide rough alignment between the reading device and the label.

The area or line CCD camera can be the basis for an omnidirectional bar code or area code reading device. The camera is used to assemble an image of the scene in a frame buffer and then this image is processed using standard image processing techniques to find, orient and decode the bar code or area code label. However, the CCD camera has many drawbacks as the image collection device for a reader. Limitations of the area CCD camera as a sensor include field of view (FOV) versus cost, depth of field (DOF), and lighting requirements. The line CCD camera has the same DOF and lighting problems.

The field of view of a cost effective omnidirectional bar code or area code reader using an area CCD camera is limited by the cost of the CCD semiconductor sensor. To read a code with a 30 mil X dimension requires approximately 10 mil samples (i.e., three pixel per min discernible feature). A typical 512×512 CCD camera can cover a maximum field of view 5 inches square. While this may be useful for some applications (pharmaceutical package verification for example) the ability to scale this to a large area like a 30 inch (or 1 meter) wide conveyor is limited by the rapid increase in cost of the CCD sensor. This cost is due to the physical size of the semiconductor which limits the number of parts that fit on a wafer and the number of elements in the device which limits the yield of the semiconductor process. Because of these factors and the limited demand for large area CCD sensors, the cost is not expected to drop appreciably in the near future.

One alternative is to use two sensors, a low resolution sensor to cover a large FOV and identify possible areas of interest coupled with a high resolution sensor with a mechanical aiming device to focus on a small FOV which contains a label. This system is limited by the speed and complexity of the mechanical mechanism and cannot process an image cluttered with many areas of interest typical of a package sorting application.

The CID array has been investigated as a solid state alternative to the two camera high/low resolution system. The CID array differs from a conventional CCD array in that pixels can be addressed and read randomly and non-destructively. This would allow it to be read out first at low resolution to identify areas of interest and then the areas containing possible labels re-read in high resolution to identify and decode the actual labels. A practical CID array does not currently exist. It is also likely that a large CID sensor would have the same high piece cost as CCD sensors.

Typical cost effective CCD cameras are limited to a two to four inch depth of field without being refocused. Better lenses and faster shutters coupled with brighter lighting can expand the DOF. However, due to the specialty nature of these lenses, the cost rises rapidly with DOF improvements. A mechanical refocusing system can provide a large DOF; however, it requires an additional height sensor and a significant time to move the lenses. There are cameras available which can focus by moving the sensor rather than the lenses. The low mass of the sensor allows this system to be very fast; however, it is an expensive option.

To image a moving object with a CCD camera requires the image to be electronically or mechanically "stopped" by reducing the duration of exposure of the sensor to less than the time for the object to move enough to smear the image. The faster the object is moving the shorter the exposure duration must be to "stop" the motion of the object. To achieve sensitivity at fast shutter speeds requires progressively brighter lighting. A strobe (or flash) light is the normal method of producing this light. A strobe may not be acceptable for use in an industrial environment around moving machinery because of the safety issues involved. Lighting of acceptable intensity, lifetime and compliance with an industrial environment can be a costly additional component in a reader.

SUMMARY OF INVENTION

It is therefore an object of this invention to provide an improved one-dimensional scanner system for acquiring two-dimensional images.

It is a further object of this invention to provide such an improved system for acquiring an image of data on moving objects.

It is a further object of this invention to provide such a system which provides at lower cost a larger depth of field, larger field of view, higher speed, and requires no separate light source.

It is a further object of this invention to provide such a system which provides a constant speed of the scanning spot across the object scanned independent of the distance of the object from the scanner.

The invention results from the realization that a truly effective one-dimensional scanning system which provides, at lower cost, a larger depth of field, larger field of view, higher speed, and requires no separate light source for acquiring two-dimensional images, can be achieved by normalizing the effective scan rates established by the sweep of the scanner and the transverse motion of the object being scanned to eliminate or reduce distortion of the pixels and image and that by using a parabolic mirror to sweep the scanning beam, the scanning spot can be made to move at the same speed across the object irrespective of the distance of the object from the scanner.

This invention features a one-dimensional scanner system for two-dimensional image acquisition. There is a flying spot scanner for scanning in a line at a first velocity in a first direction across an object which is moving at a second velocity in a second direction transverse to the first direction. The first and second velocities establish a first sample rate in the second direction for defining a pixel size in the second direction. A timing device detects the velocity of the object in the second direction and generates a second sample rate in the first direction. A frame accumulator reads in and stores each line scanned, assembles a two-dimensional image of the object and reads out that image. The frame accumulator includes a compensation device responsive to the second sample rate for normalizing the second sample rate with the first sample rate to eliminate distortion in the pixel size and the two-dimensional image in the first direction.

In a preferred embodiment, the scanner may include means for generating a scanning spot beam and a parabolic output mirror for maintaining the scanning beam in positions generally parallel to each other over the scanning sweep for maintaining the speed of the spot over the spot scan path independent of the distance of the object from the scanner. The scanner may include a folding mirror for redirecting the scanning beam from the means for generating to the parabolic output mirror. The means for generating may include a laser source and a rotating faceted wheel for creating a scanning beam and receiving a beam from the laser source. The object may be moving on a conveyor and the timing device may include means for detecting the speed of the conveyor. The frame accumulator may include a data acquisition channel for acquiring and storing the output from the scanner. The scanner may include a detector device responsive to the scanning beam returning from the object scanned for sensing the data borne by the object. The data acquisition channel may include an A/D converter responsive to the scanner for providing a digital signal representative of each pixel of data sensed on the object scanned, and an address logic circuit for assigning an address for storage of each pixel. The frame accumulator may include a data compression channel for identifying the start, length and intensity of contiguously scanned pixels of like intensity. The compensation device may include first means for determining the duration of a scan line in a first direction and a second means for determining the distance between the scan lines in a second direction, and means responsive to the first and second means for setting the second sample rate relative to the first sample rate to produce undistorted pixels and images. The second sample rate may be set to produce a generally square pixel.

The invention also features a one-dimensional scanning system for acquiring a two-dimensional image of data on moving objects. There is a flying spot scanner for scanning in a line in a first direction across data on an object which is moving in a second direction transverse to the first direction. The frame accumulator reads in and stores each line scanned and assembles from the raster created by the motion of the scanned object a two-dimensional image of that data on the object.

DISCLOSURE OF PREFERRED EMBODIMENT

Other objects, features and advantages will occur to those skilled in the art from the following description of a preferred embodiment and the accompanying drawings, in which:

FIG. 5 is an enlarged view of a portion of the two-dimensional label shown on the object of FIG. 4 as it is stored in the buffer of FIG. 1;

Figure 1:
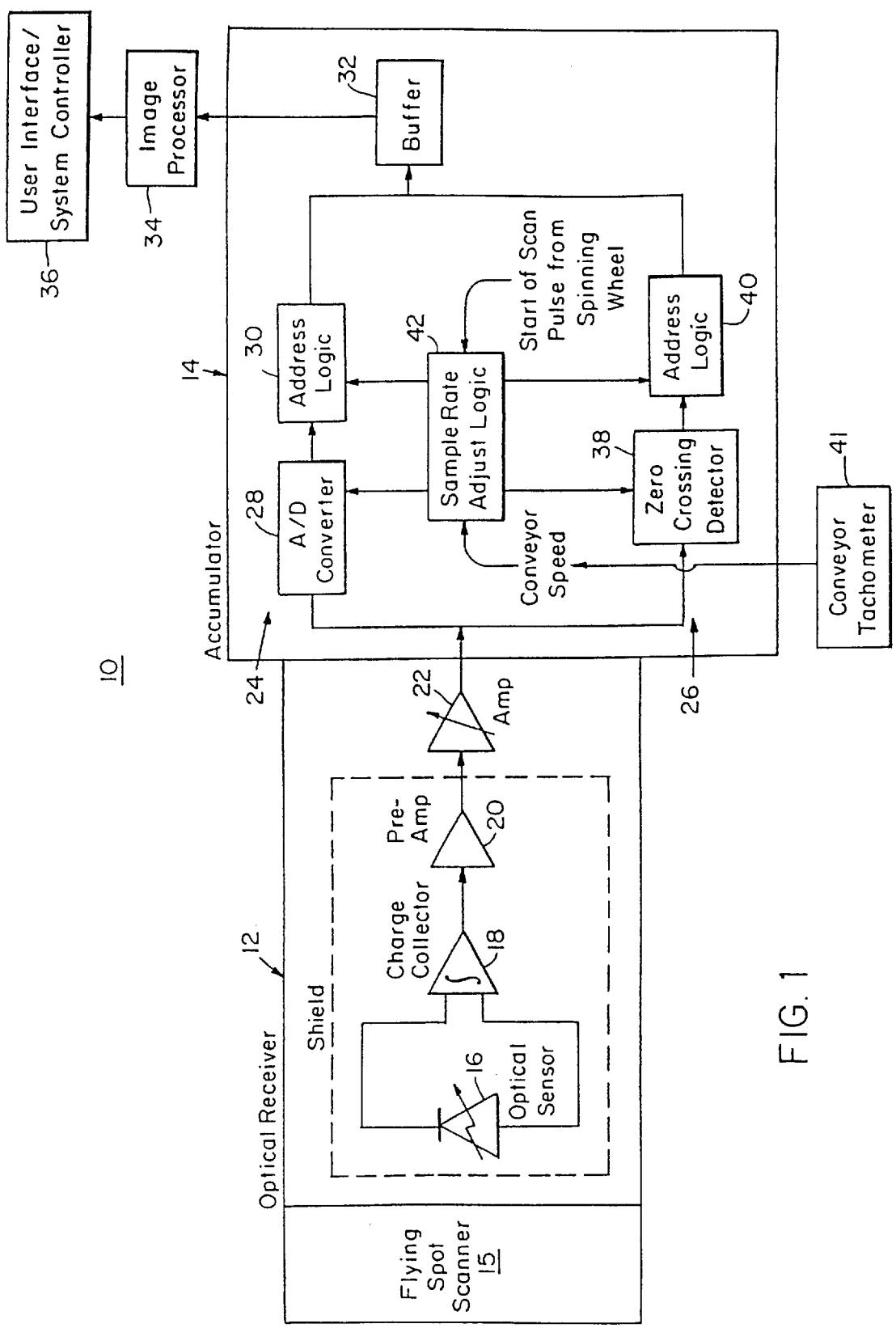
FIG. 1 is a schematic block diagram of a one-dimensional scanner system for two-dimensional image acquisition according to this invention.

There is shown in FIG. 1 a one-dimensional scanner system for two-dimensional image acquisition according to this invention which includes an optical receiver 12 and a frame accumulator 14. The input to optical receiver 12 comes from flying spot scanner 15 which scans objects as they move by on the conveyor. Optical receiver 12 includes an optical sensor 16 which senses the return signal from a scanned object moving along a conveyor and delivers a signal representative of the data scanned to charge collector amplifier 18. The output of amplifier 18 is delivered through pre-amp 20 to an adjustable amplifier 22 and provides the ultimate input to frame accumulator 14. Frame accumulator 14 has a data acquisition channel 24 and a data compression channel 26.

Data acquisition channel 24 includes an A/D converter 28 which receives the analog signal from amplifier 22 and provides a digital output to address logic 30 which identifies a specific address for each pixel to be stored in buffer 32. The output of buffer 32 is delivered to image processor 34 which may be a microprocessor programmed with, for example, a recognition algorithm based on linear search, cross correlation, morphological analysis, or frequency domain analysis, but with any conventional software for label data acquisition and interpretation such as the Automatic Identification Manufacturers (AIM), Uniform Symbology Specification (USS) Reference Decode Algorithm for PDF417 or Code 1. Image processor 34 then provides an output to any suitable interface system or controller 36. Data compression channel 26 includes zero crossing detector 38 which detects each zero crossing from a pixel of one intensity to a pixel of a distinguishable intensity, for example, between black and white or between 8, 16 or 256 shades of gray. The zero crossing detector records the start, length and intensity of contiguously scanned pixels of like intensity. The output of each such zero crossing is delivered to address logic 40 which then causes the address of the start, the length, and the level of intensity to be stored for that particular series of like intensity pixels, thereby avoiding the need to store each of the pixels. In order to obtain square pixels a compensating device such as a sample rate adjust logic circuit 42 is used to synchronize the operation of A/D converter 28, zero crossing detector 38, and address logics 30 and 40. Sample rate adjust logic 42 receives the conveyor speed input from a conveyor tachometer or a similar timing device 41. It also receives a start-of-scan pulse from the spinning wheel of flying spot scanner 15, explained in more detail in FIGS. 2 and 3.

Figure 2:
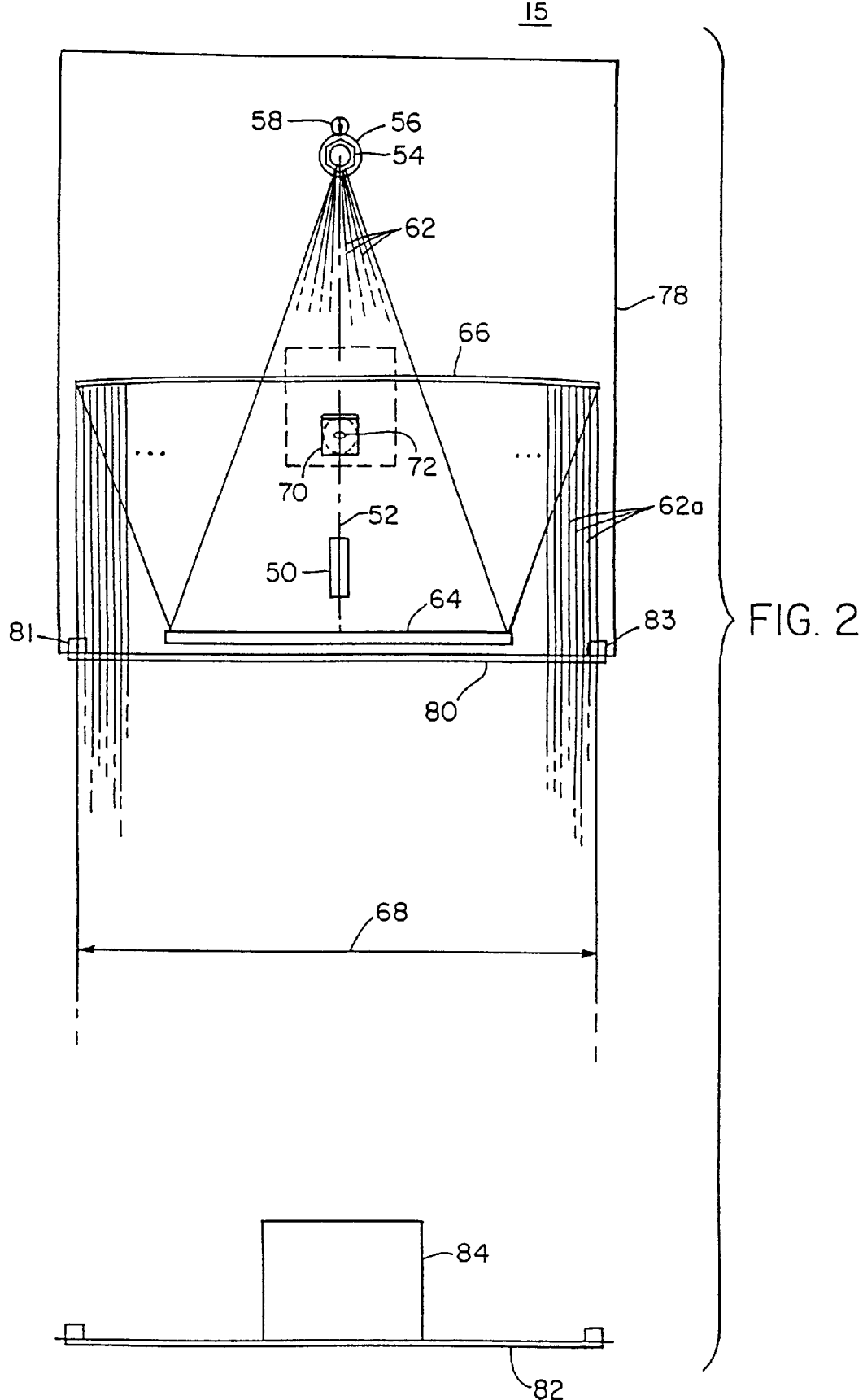
FIG. 2 is a front elevational schematic view of the optical portion of a one-dimensional scanner system for two-dimensional image acquisition according to this invention arranged to scan a box on a moving conveyor below it.
Figure 3:
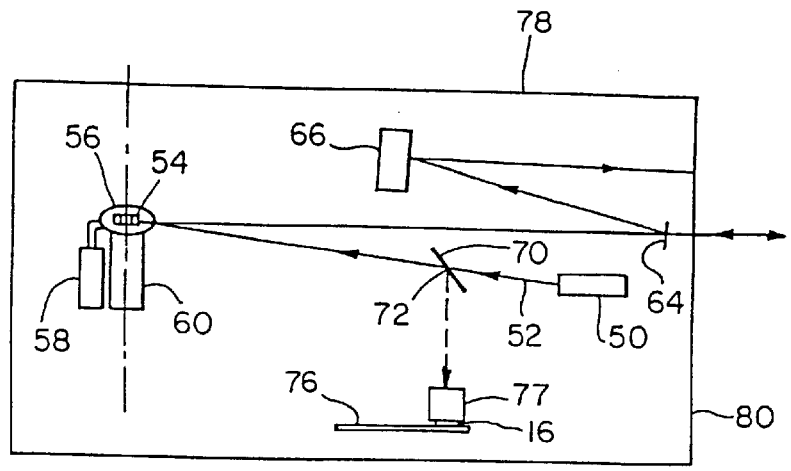
FIG. 3 is a side elevational view of the scanning system of FIG. 1.

Flying spot scanner 15, FIGS. 2 and 3, includes a laser diode 50 which directs a beam 52 to rotating or spinning faceted wheel 54 which may be encased in a vacuum chamber 56 to reduce air friction. The vacuum chamber is maintained through vacuum pump 58 and wheel 54 is spun or driven by air bearing motor 60. Motor 60 may drive wheel 54 at speeds of up to 30,000–40,000 RPM in air. Wheel 54 may be driven at speeds beyond 30,000 or 40,000 RPM up to levels of 80,000 or 90,000 RPM; hence the desirability of vacuum housing 56. The rotation of wheel 54 generates from beam 52 a series of scanning spot beams 62 which strike folding mirror 64 and are folded or redirected back to parabolic mirror 66. The use of parabolic mirror 66 converts the angle orientation of scanning beams 62 to the parallel orientation 62a of the scanning spot beams as they leave parabolic mirror 66. This enables the spot traveling along scan path 68 to always travel at the same speed, no matter how far the object to be scanned is from the rotating wheel 54. Some portion of the laser light is reflected by the object forming a return beam. The return beams return along a coaxial path until they reach return mirror 70 which contains a small hole 72 for passing the original beam 52 from laser 50. Since the beam is now somewhat spread, most of the beam strikes return mirror 70 around that hole and is directed through receiver telescope 77 to optical sensor 16 on the optical receiver electronic circuit board 76. The entire apparatus can be contained in housing 78 with a transparent enclosure window 80 and located above conveyor 82 which conveys the objects 84 to be scanned. In FIG. 2 the objects are moving into or out of the paper while the scan lines move across the object laterally from left to right or right to left.

The beginning and end of each scan line is marked by sensors 81 and 83, respectively, that sense the beginning and the end of the scan line.

Figure 4:
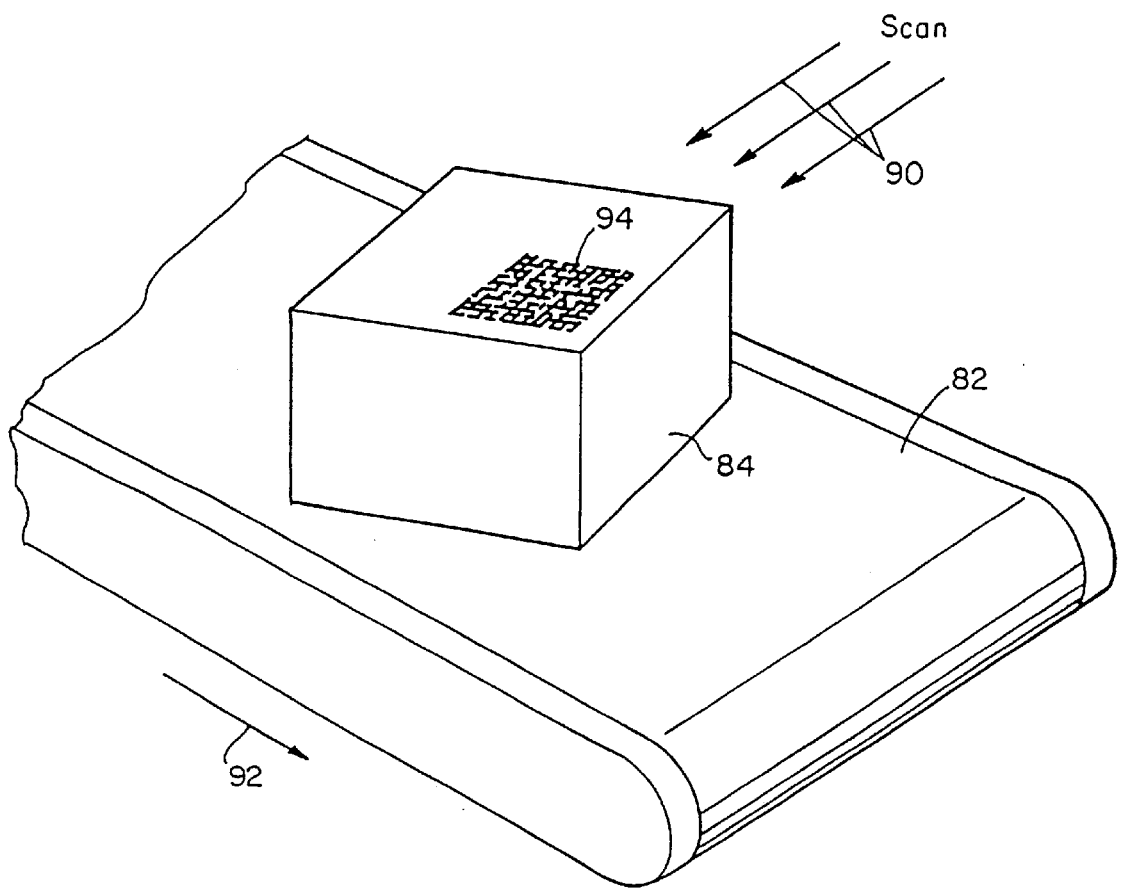
FIG. 4 is a diagrammatic perspective view of an object moving on a conveyor showing a relative directions of the conveyor motion and the scan lines.
Figure 6:
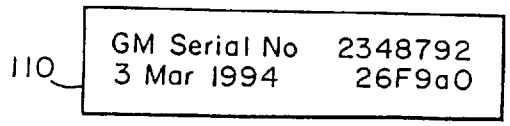
FIG. 6 illustrates typical information obtained from decoding the label.

Typically, as shown in FIG. 4, a flying spot scanner provides a plurality of scan lines 90 which define the path of the spot. These scan lines scan at a first velocity in a first direction while the object 84 moves on conveyor 82 at a second velocity in a second direction 92. Object 84 carries a two-dimensional label 94 bearing information to be acquired by the scanner system of this invention. When the speed of the scan lines 90, FIG. 5, is properly synchronized with the speed of the object 84 on the conveyor, each pixel 98 is undistorted, for example, has a square shape. Each column of pixels 100 represents the data acquisition made by the flying spot for each of the scan lines 90. Each row of pixels 102 is determined by the speed of the sampling rate of the A/D converter 28, FIG. 1. The entire label 94 may actually represent, when translated by image processor 34 and interface 36, a simple statement identifying manufacturer, date and serial number, for example, such as shown in box 110, FIG. 6.

Figure 7:
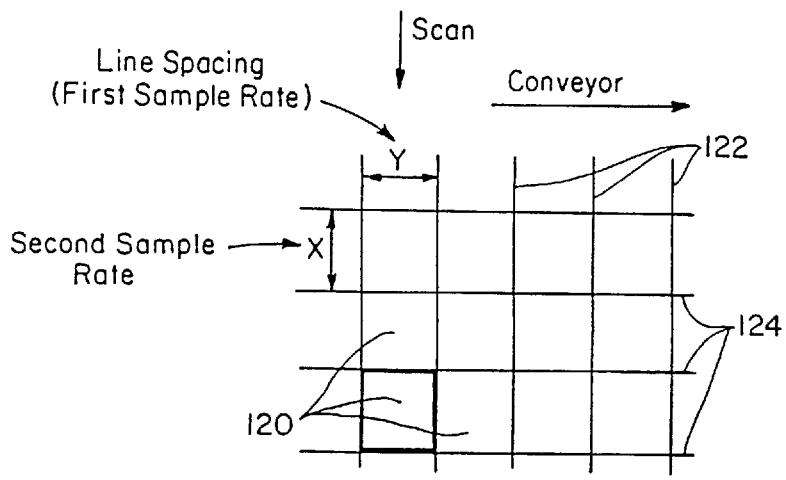
FIG. 7 is a line diagram showing the line spacing and sampling rate that develop square pixels such as shown in FIG. 5.
Figure 8:
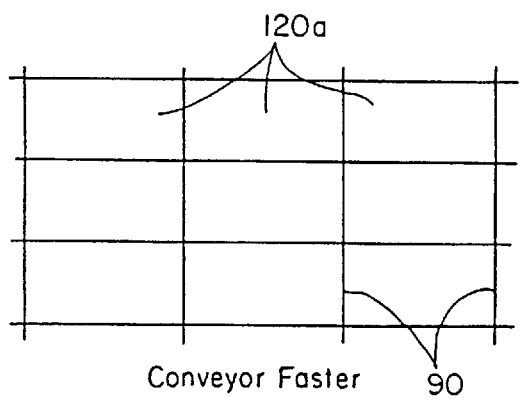
FIG. 8 is an illustration similar to FIG. 6 where the conveyor speed is increased and the pixels are elongated along the conveyor direction.
Figure 10:
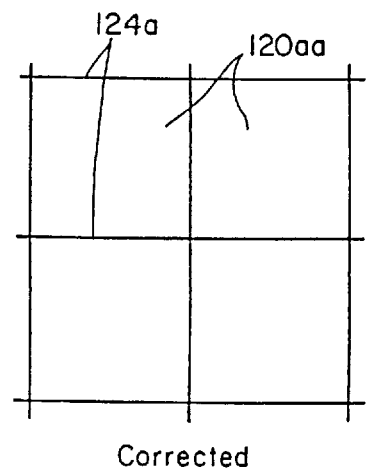
FIG. 10 illustrates the square pixels obtained when the sample rate is adjusted to overcome the increased conveyor speed as represented in FIG. 8.
Figure 9:
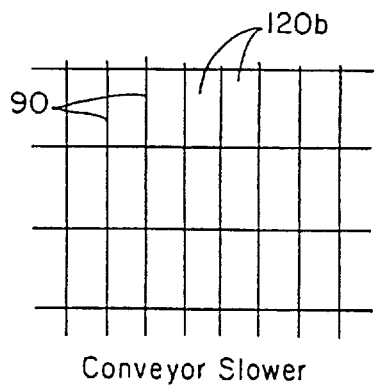
FIG. 9 is a view similar to FIG. 7 wherein the conveyor is operating at slower speed and the scan lines are closer than in FIG. 7 and produce foreshortened pixels.
Figure 11:
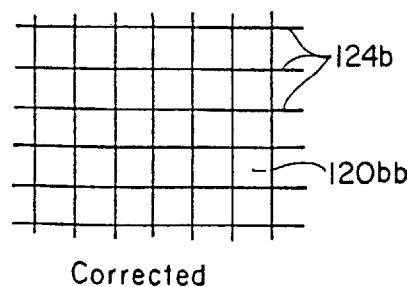
FIG. 11 illustrates the square pixels obtained when the sample rate is decreased in order to accommodate the slower conveyor speed represented in FIG. 9.

The synchronization between the scan rate and the velocity of the conveyor is necessary to provide undistorted pixels to produce an undistorted two-dimensional image of the one-dimensional scan as shown in FIGS. 7–11. For example, as shown in FIG. 7, where vertical lines 122 symbolize the line spacing of scan lines 90 whereas the horizontal lines 124 symbolize the sample rate of the A/D converter 28, a small portion of the label, as shown in FIG. 5, is indicated as having pixels 120 which are all equal in size and square in shape. However, as shown in FIG. 8, if the conveyor were suddenly to start to move faster, pixels 120 would take on an elongated shape 120a, FIG. 8, stretched in the direction of the conveyor motion. This is so because the scan lines 90 would be spaced farther apart. Conversely, if the conveyor began to move more slowly, as shown in FIG. 9, the scan lines 90 would occur closer together foreshortening the pixels as indicated at 120b.

Figure 12:
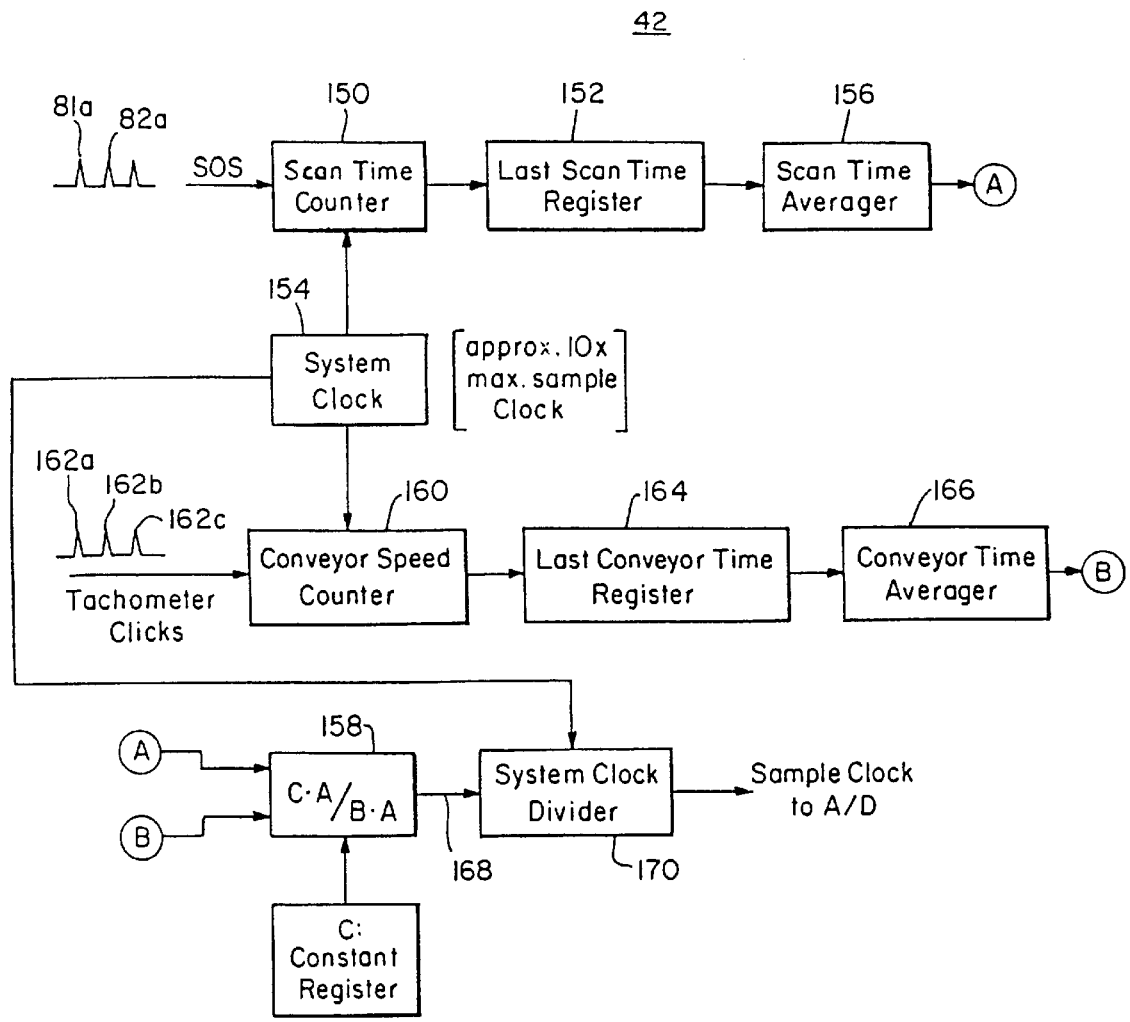
FIG. 12 is a schematic block diagram of the compensator device of FIG. 1.

This distortion of the pixels 120 in FIGS. 8 and 9 can be corrected by adjusting the sampling rate of A/D converter 28, FIG. 1. Thus in FIG. 10 the sampling rate, as indicated by lines 124a have been spaced farther apart: that is, the A/D sampling rate has been slowed down so that the pixels 120aa are once again square. Conversely, in FIG. 11 the sampling rate has been increased so that lines 124b occur closer together and reestablish once again the square shape of pixels 120bb. The synchronization required to perform this adjustment is accomplished by sample rate adjustment circuit 42, FIG. 12, that includes scan time counter 150 which responds to the receipt of an output from the beginning and end of scan line sensors 81, 83, FIG. 2 shifts its count into the last scan time register 152 and begins to count again. Scan time counter 150 counts the number of clock pulses from system clock 154 during the time between the beginning and end of scan pulses 81a and 82a, respectively. The times stored in register 152 are typically averaged over a large period of time in scan time averager 156 and delivered to the sample rate calculator 158. Separately, the output from timing device 41, such as a tachometer on the conveyor, is delivered to conveyor speed counter 160. Conveyor speed counter 160 counts the number of clock pulses from system clock 154 between the tachometer clicks 162a, 162b, 162c, and delivers the time to last conveyor time register 164. As with the scan time, these times are averaged in a conveyor time averager 166 whose output is delivered to sample rate calculator 158. Since the scan line extends for a length of approximately thirty inches whereas the tachometer registers the passage of the conveyor approximately every tenth of an inch, a constant value C is introduced into the sample time calculator 158 in order to produce the proper scaling factor. The output representing the proper sample time expressed in system clock pulses is delivered on line 168 to system clock divider 170 which provides a direct input to A/D converter 28, address logic 30, zero crossing detector 38, and address logic 40.

The theory of operation of sample rate adjust logic 42 can be understood in accordance with the following explanation. The first sample rate is defined as that of the line spacing, that is, the distance between scan lines in the direction of the conveyor motion. The second sample rate, which is the sample rate of A/D converter 28, is defined as follows.

$$\text{2nd sample rate} = \frac{\text{linespacing(1st s.r.)}}{\text{scan(spot)speed}} \quad (1)$$

This can be expressed as:

$$\text{2nd sample rate} = \frac{\text{conveyor speed} \cdot (t_1 - t_2)}{\left(\frac{\text{height of scan}}{(t_1 - t_2)}\right)} \quad (2)$$

As simplified, then the second sample rate becomes $$\text{2nd sample rate} = \frac{\text{conveyor speed} \cdot (t_1 - t_2)^2}{\text{height of scan}} \quad (3)$$

where conveyor speed equals distance over time, scan time equals $t_1-t_2$, height of scan is actually the length of scan from the beginning to the end of the scan line, line spacing is the conveyor speed times the scan time, and the scan (spot) speed is the height of scan over scan time. For a situation in which the conveyor is moving at 200 feet per minute and there are 4,000 scans per second each of which is thirty inches in length, the sample rate can be calculated as follows:

$$\text{2nd sample rate} = \frac{200 \text{ ft/min} \cdot \left(\frac{1 \text{ sec}}{4{,}000 \text{ scans}}\right)^2}{30 \text{ inches}} \quad (4)$$

$$\text{2nd sample rate} = \frac{200 \text{ ft} \cdot 12}{30 \text{ inches}} \cdot \frac{\text{sec} \cdot \text{sec}}{\text{min} \cdot 60 \text{ sec}} \cdot \frac{1}{4{,}000^2 \text{ scans}^2} \quad (5)$$

$$\text{2nd sample rate} = \frac{2400}{1800 \cdot 16 \times 10^6} \text{ sec} \quad (6)$$

$$\approx 83 \text{ nS}(12 \text{ MHz}) \quad (7)$$

Figure 13:
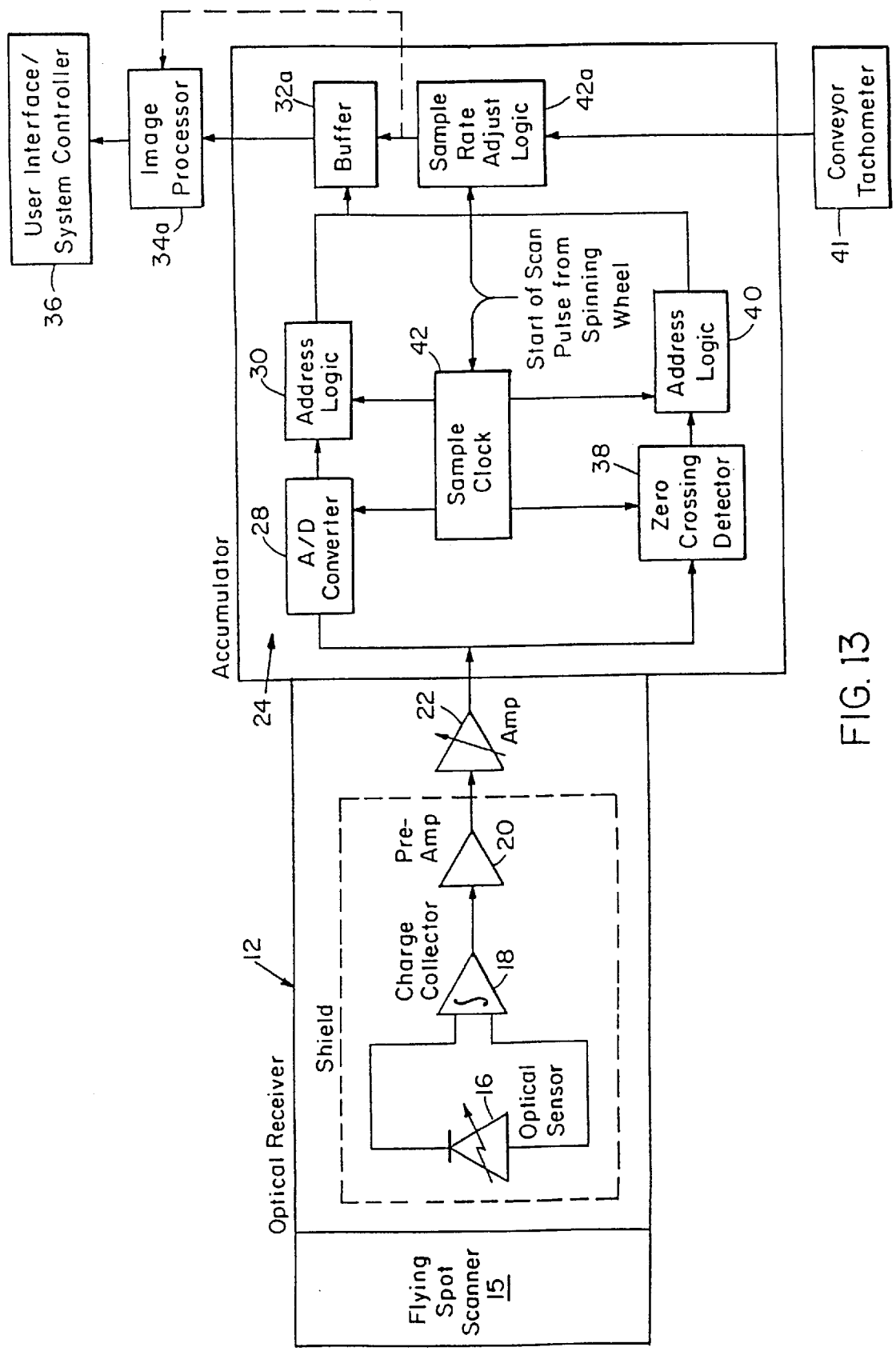
FIG. 13 is an alternative embodiment of the one-dimensional scanner system as shown in FIG. 1.

Although thus far the sample rate adjust logic 42 has been shown as an integral part of the frame accumulator 14, this is not a necessary limitation of the invention as the sample rate adjust logic may be provided subsequent to that process directly into the buffer 32a, FIG. 13, or even into the ultimate image processor 34a.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A one-dimensional scanner system for two-dimensional image acquisition, comprising:

a scanner device for scanning, at a first velocity in a first direction, an object whose image is to be scanned while said object is moving at a second velocity in a second direction, transverse to said first direction, providing a series of pixels having a predetermined dimension ratio in said first and second direction; and a frame accumulator including a data acquisition channel, for sampling and storing said pixels at a sampling rate which is a function of said second velocity, and a compensation device, responsive to a change in said second velocity which distorts said predetermined dimension ratio in said second direction, for adjusting said sampling rate of said data acquisition channel in said first direction, while maintaining said first velocity of said scanner device constant, to restore said predetermined dimension ratio of said pixels irrespective of said change in said second velocity.

2. The scanner system of claim 1 in which said compensation device includes a sample rate adjust logic circuit which adjusts the number of samples of a pixel in said first direction, relative to the change in number of samples in said second direction due to said change of said second velocity in said second direction, for maintaining said predetermined dimension ratio of said pixels.

3. The scanner system of claim 2 in which said sample rate adjust logic circuit includes means to decrease said sampling rate in said first direction in response to an increase in velocity in said second direction and to increase said sample rate in said first direction in response to a decrease in velocity in said second direction.

4. The scanner system of claim 1 in which said frame accumulator further includes a data compression channel for identifying the start, length and intensity of contiguously scanned pixels of like intensity; said data compression channel includes a zero-crossing detector for detecting transitions in pixel intensity and an address logic circuit for assigning an address for storage of said pixel transition information.

5. The scanner system of claim 1 in which said scanner system includes means for generating a scanning spot beam and a parabolic output mirror for maintaining said scanning spot beam positions generally parallel with each other over a scanning sweep, whereby the speed of said scanning spot beam over said scanning spot beam path remains constant, independent of the distance between said object and said scanner.

6. The scanner system of claim 5 in which said scanner system includes a folding mirror for redirecting said scanning spot beam from said means for generating to said parabolic output mirror.

7. The scanner system of claim 6 in which said means for generating includes a laser source and a rotating faceted wheel for receiving a beam from said laser source and creating said scanning spot beam.

8. The scanner system of claim 5 in which said scanner system includes a detector device, responsive to said scanning spot beam returning from said object scanned, for sensing data borne by said object.

9. The scanner system of claim 1 in which said data acquisition channel includes an A/D converter, responsive to said scanner, for providing a digital signal representative of each said pixel of data sensed and an address logic circuit for assigning an address for storage of each said pixel.

10. The scanner system of claim 1 in which said frame accumulator includes means for sensing said second velocity.

11. The scanner system of claim 1 in which said scanner device includes means for sensing said first velocity.

* * * * *